No. 824,381. PATENTED JUNE 26, 1906.
D. POWNER & T. C. THOMPSON.
SAFETY GATE FOR HOISTS.
APPLICATION FILED MAY 26, 1905.

2 SHEETS—SHEET 1.

No. 824,381. PATENTED JUNE 26, 1906.
D. POWNER & T. C. THOMPSON.
SAFETY GATE FOR HOISTS.
APPLICATION FILED MAY 26, 1905.

2 SHEETS—SHEET 2.

UNITED STATES PATENT OFFICE.

DIXON POWNER AND THOMAS COATES THOMPSON, OF LEEDS, ENGLAND.

SAFETY-GATE FOR HOISTS.

No. 824,381.  Specification of Letters Patent.  Patented June 26, 1906.

Application filed May 26, 1905. Serial No. 262,447.

*To all whom it may concern:*

Be it known that we, DIXON POWNER and THOMAS COATES THOMPSON, subjects of the King of Great Britain and Ireland, residing at Leeds, in the county of York, England, have invented a new and useful Safety-Gate for Hoists, of which the following is a specification.

This invention relates to automatic devices for closing the gates to the shaft-openings at the various stations or landings of lifts, and particularly to that class of device wherein cams on the cage come in contact with mechanism on each gate as the cage leaves the same when either ascending or descending, and thereby cause the gate to close should it have been left open, the object being to avoid the danger of the gates being accidentally left open when the cage has moved away.

The special object of the present invention is to provide simple mechanism which can be easily and economically applied to existing gates and cages, which will effectively close each gate as the cage leaves it and will also lock the gate when closed, so that it cannot be opened until the cage is opposite to it.

Figure 1:
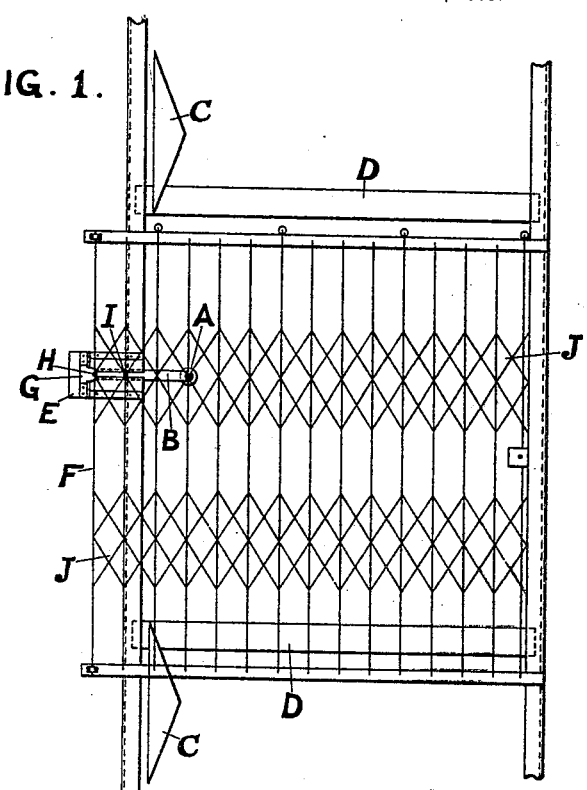
Figure 2:
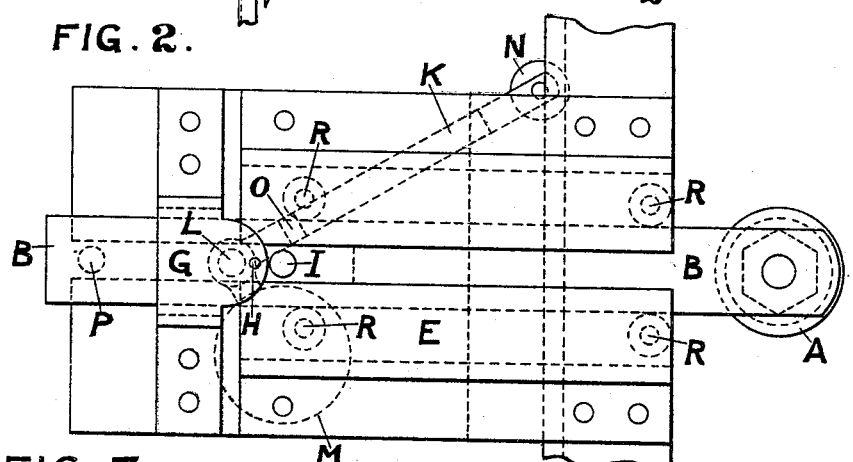
Figure 3:
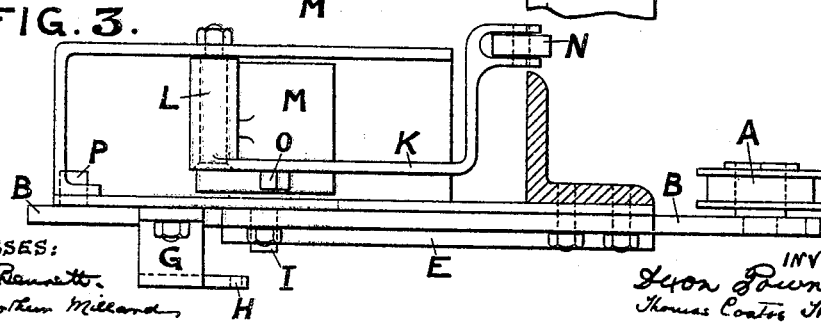
Figure 4:
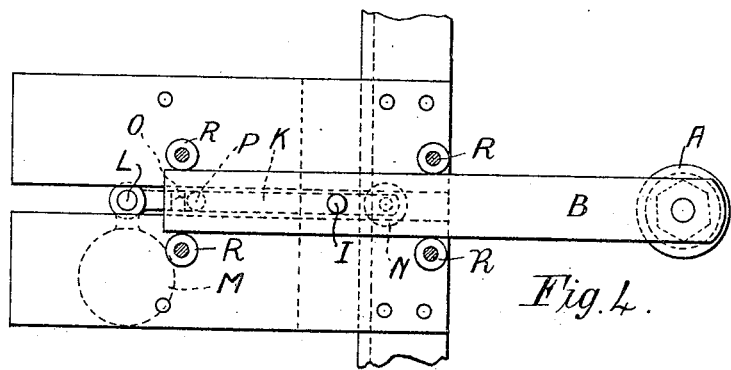
Figure 5:
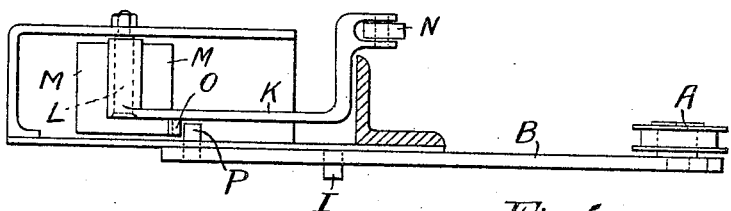

Referring to the accompanying drawings, Figure 1 is a front elevation of part of an elevator or hoist, showing the gate closed, with the cage opposite to the gate and with the invention applied. Fig. 2 is an elevation, and Fig. 3 a plan, of the essential parts of the invention detached and in the position assumed when the gate is open. Fig. 4 is an elevation similar to Fig. 2, but with the parts in the position assumed when the gate is closed, some of the front plates being removed for sake of clearness. Fig. 5 is a view like Fig. 3, but showing the parts in the position assumed when the gate is closed.

Similar letters of reference indicate corresponding parts throughout the several views.

In applying our invention to a hoist or elevator each sliding gate or guard is provided with a suitable runner or roller A, arranged on a horizontal slide-bar B, this runner or roller A being adapted to engage with double wedges C C, fixed both at the top and at the bottom of the cage D. The said slide-bar B is preferably arranged to slide within bearing-rollers R in a flat box or casing E, which is rigidly attached to the fixed end bar F of the gate by means of bracket G and bolt or rivet H. The slide-bar B is connected at I to the movable part of the gate, and the movement of the runner A is transmitted and multiplied to give the desired length of traverse by means of lazy-tongs J or by means of expanding toggle or like mechanism.

Means may be provided for automatically locking the gate or guard in its closed or extended position as soon as the cage D moves away from the landing in either direction. Such locking device consists of a cranked lever K, mounted on a spindle L within the rear part of the box E and having a counterbalance-weight M and a terminal runner N, adapted to make contact with the side of the cage D. As the cage approaches the landing, therefore, the lever K is moved either upward or downward into an inclined position, as shown in Fig. 2, and the gate or guard is then free to be opened by the attendant. When the cage D moves away from the landing and the gate or guard has been automatically closed, the runner N is released from contact with the cage and the lever K takes up a horizontal position. A projection O on the lever K is therefore brought within the path of a stop-pin P, carried by the slide-bar B, and the gate or guard is thereby automatically locked in its closed position until the runner N is again actuated by contact with the cage D.

What we claim as our invention, and desire to secure by Letters Patent, is—

1. In a hoist, lift, or elevator having a sliding gate a roller thereon and closing-cams on the cage for engaging said roller, the combination of a sliding bar on the gate and means for arresting the movement of said bar when the cage is not opposite the gate, said locking means being rendered inoperative by the cage as it moves into a position opposite the gate.

2. In a hoist, lift or elevator having a sliding gate, a roller thereon and gate-closing cams on the cage adapted to engage a roller on the gate, the combination of a sliding bar on the gate, a projection on said bar, a weighted and pivoted lever, one end of which normally projects into the path of the cage and a projection on said lever normally projecting into the path of the projection on the sliding bar, substantially as and for the purpose hereinbefore set forth.

3. In a hoist, lift or elevator having a sliding gate, a roller thereon and gate-closing cams on the cage adapted to engage a roller on the gate, the combination of a sliding bar on the gate, a guide for the same fitted with bearing-rollers, a weighted and pivoted lever one end of which normally projects into the path of the cage and the other end of which normally projects into the path of the sliding bar, substantially as and for the purpose hereinbefore set forth.

In testimony wherof we have signed our names to this specification in the presence of two subscribing witnesses.

DIXON POWNER.
THOMAS COATES THOMPSON.

Witnesses:
ALLAN BENNETT,
WALTER ARTHUR MILLARD.